United States Patent
Chiang et al.

(10) Patent No.: US 9,984,275 B2
(45) Date of Patent: May 29, 2018

(54) FINGERPRINT SENSOR HAVING ELECTROSTATIC DISCHARGE PROTECTION

(71) Applicant: ELAN MICROELECTRONICS CORPORATION, HsinChu (TW)

(72) Inventors: Tsung-Yin Chiang, Hsinchu (TW); Chun-Chi Wang, Nantou County (TW); Chung-An Tang, Hsinchu County (TW)

(73) Assignee: ELAN MICROELECTRONICS CORPORATION, HsinChu (TW)

( * ) Notice: Subject to any disclaimer, the term of this patent is extended or adjusted under 35 U.S.C. 154(b) by 0 days. days.

(21) Appl. No.: 15/268,629

(22) Filed: Sep. 18, 2016

(65) Prior Publication Data
US 2017/0286744 A1    Oct. 5, 2017

Related U.S. Application Data

(60) Provisional application No. 62/315,013, filed on Mar. 30, 2016.

(30) Foreign Application Priority Data

Jun. 13, 2016  (TW) .............................. 105118286 A

(51) Int. Cl.
G06K 9/00       (2006.01)
(52) U.S. Cl.
CPC ....... *G06K 9/00053* (2013.01); *G06K 9/0002* (2013.01)
(58) Field of Classification Search
CPC .......................... G06K 9/00053; G06K 9/0002

USPC ............................................. 382/124; 356/71
See application file for complete search history.

(56) References Cited

U.S. PATENT DOCUMENTS

| 5,778,089 A * | 7/1998 | Borza ................... G06K 9/0002 250/556 |
| 6,333,989 B1 * | 12/2001 | Borza ................... G06K 9/0002 250/556 |
| 6,346,739 B1 * | 2/2002 | Lepert ................. G06K 9/00053 257/532 |
| 6,628,812 B1 * | 9/2003 | Setlak ................... G06F 1/1616 382/124 |
| 6,686,546 B2 * | 2/2004 | Chiu ................... G06K 9/00053 178/18.01 |
| 7,076,089 B2 * | 7/2006 | Brandt ............... G06K 9/00053 382/124 |
| 7,208,961 B2 * | 4/2007 | Miyasaka ............ G06K 9/0002 324/658 |

(Continued)

FOREIGN PATENT DOCUMENTS

| CN | 103942530 A | 7/2014 |
| TW | 201543376 A | 11/2015 |

*Primary Examiner* — Samir Ahmed
(74) *Attorney, Agent, or Firm* — Winston Hsu

(57) ABSTRACT

A fingerprint sensor having electrostatic discharge (ESD) protection includes a first ESD protection electrode and a second ESD protection electrode. The first ESD protection electrode is connected to an ESD protection circuit for providing an ESD path, where the first ESD protection electrode and a fingerprint sensor electrode array are formed in a same layer of the fingerprint sensor. The second ESD electrode is connected to the first ESD electrode via multiple conductive via.

9 Claims, 11 Drawing Sheets

(56) References Cited

U.S. PATENT DOCUMENTS

| | | | | |
|---|---|---|---|---|
| 8,598,667 | B2* | 12/2013 | Moriwaki | G02F 1/136204 |
| | | | | 257/355 |
| 8,716,613 | B2* | 5/2014 | Pererselsky | G06K 9/00053 |
| | | | | 178/18.03 |
| 9,342,194 | B2* | 5/2016 | Schneider | G06F 3/044 |
| 2002/0121145 | A1* | 9/2002 | DeConde | G06K 9/0002 |
| | | | | 73/862.046 |

* cited by examiner

FINGERPRINT SENSOR HAVING ELECTROSTATIC DISCHARGE PROTECTION

CROSS REFERENCE TO RELATED APPLICATIONS

This application claims the benefit of U.S. Provisional Application No. 62/315,013, filed on Mar. 30, 2016, the contents of which are incorporated herein.

BACKGROUND OF THE INVENTION

1. Field of the Invention

The present invention relates to a fingerprint sensor, and more particularly, to a fingerprint sensor having electrostatic discharge protection.

2. Description of the Prior Art

Capacitive fingerprint sensor detects induced capacitance variation by a fingerprint sensor electrode array to recognize ridge or valley of a fingerprint, so as to recognize the fingerprint of a user.

In order to protect the fingerprint sensor from damaging by the electrostatic charge on the human body, the fingerprint sensor is usually equipped an electrostatic discharge (ESD) protection electrode to provide an ESD path for the purpose of ESD protection.

SUMMARY OF THE INVENTION

It is therefore an objective of the present invention to provide a fingerprint sensor having electrostatic discharge protection.

The present invention discloses a fingerprint sensor having electrostatic discharge protection, including a first ESD protection electrode and a second ESD protection electrode. The first ESD protection electrode is connected to an ESD protection circuit, to provide an ESD path, wherein the first ESD protection electrode is coplanar with a fingerprint sensor electrode array. The second ESD protection electrode is connected to the first ESD protection electrode by multiple conductive via.

Under the above mentioned structure, the electrostatic current can flow to the ESD protection circuit through the first ESD protection electrode, to protect the fingerprint sensor from damaging to achieve the purpose of ESD protection. The present invention further includes the second ESD protection electrode, where the first and second ESD protection electrodes are connected by the conductive via, which provides an ESD path with lower resistance for the electrostatic current, to improve ESD protection performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
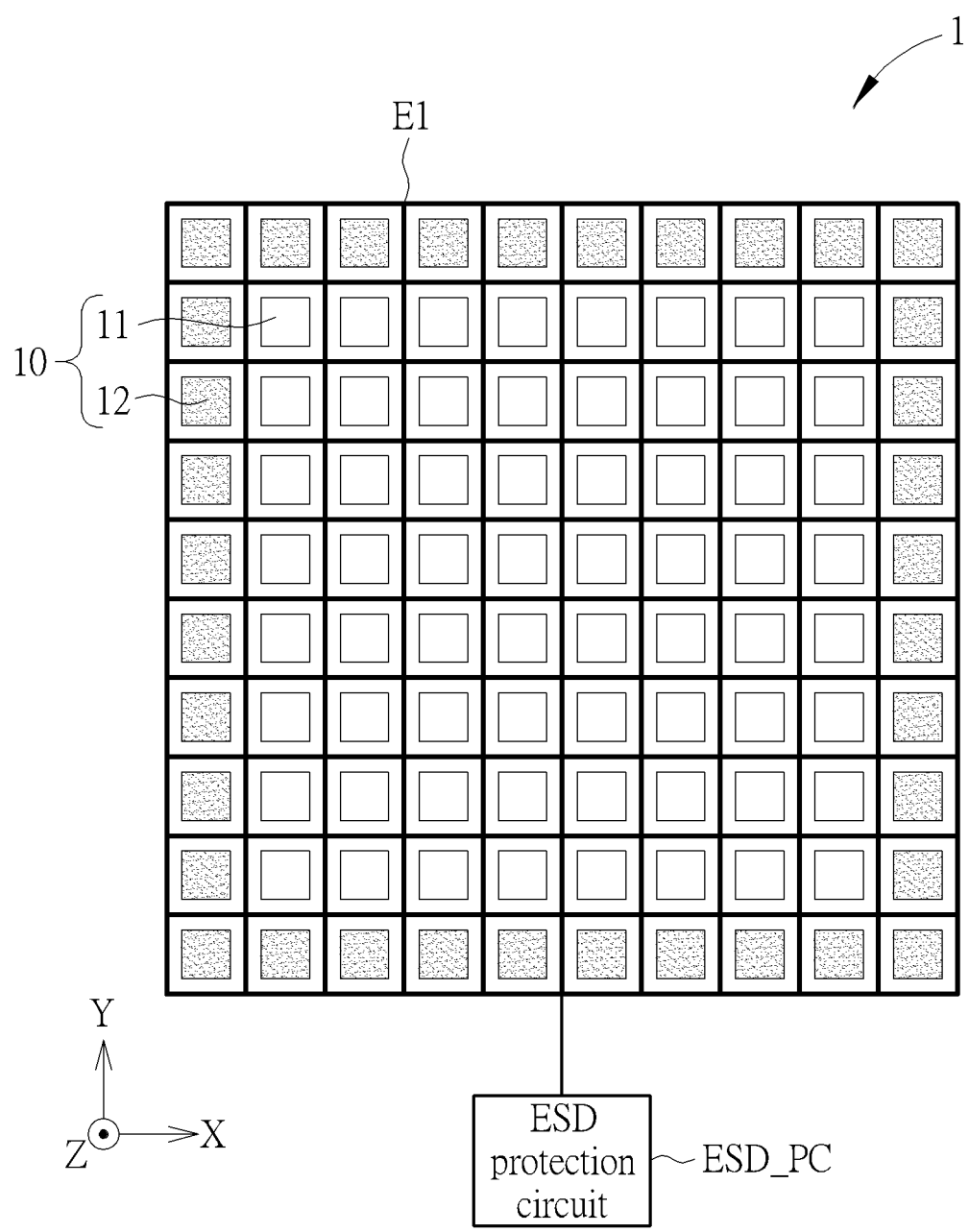
FIG. 1 and FIG. 2 illustrate a top view and an enlarged top perspective view of a fingerprint sensor according to an embodiment of the present invention, respectively.
Figure 2:
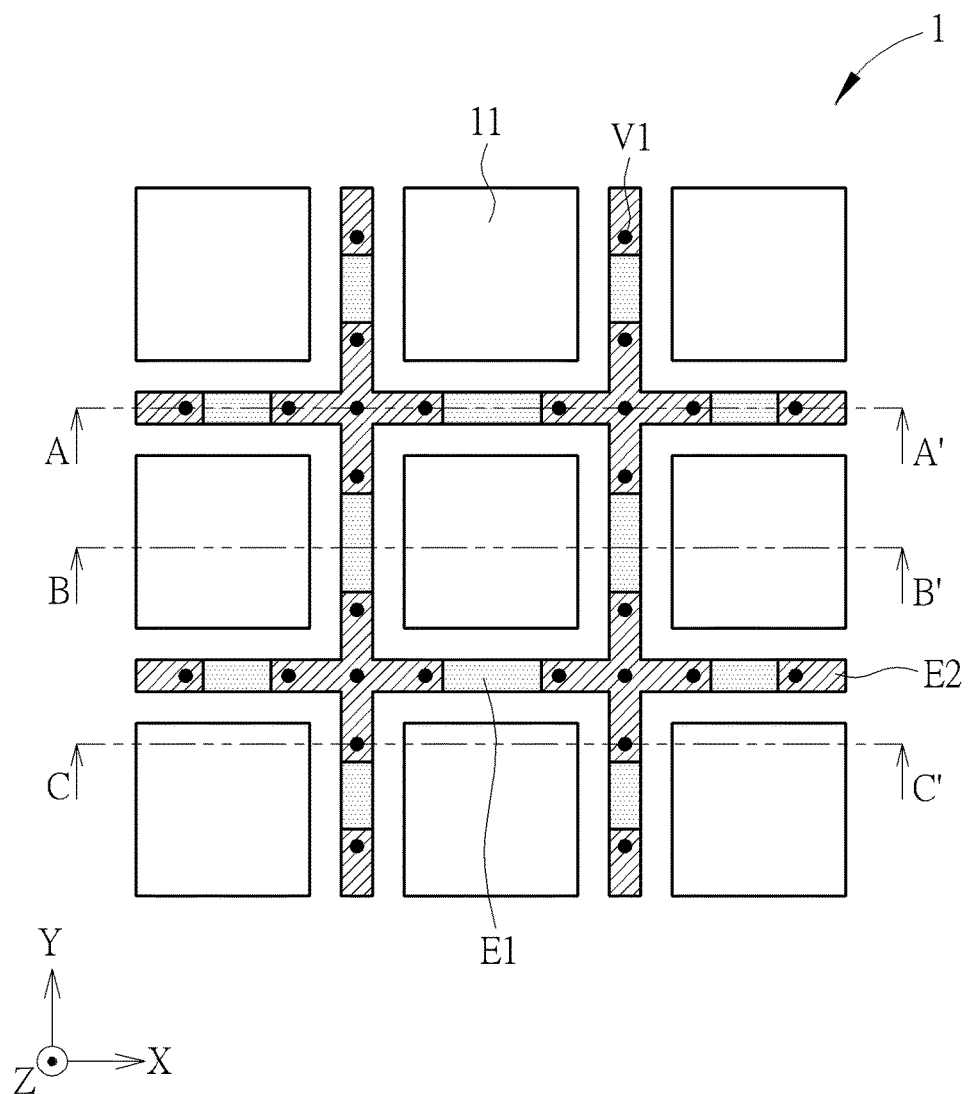

FIG. 1 and FIG. 2 illustrate a top view and an enlarged top perspective view of a fingerprint sensor 1 having electrostatic discharge (ESD) protection according to an embodiment of the present invention. As shown in FIG. 1, the fingerprint sensor 1 includes a fingerprint sensor electrode array 10, an ESD protection electrode E1, an ESD protection circuit ESD_PC connected to the ESD protection electrode E1. The fingerprint sensor electrode array 10 includes multiple sensor electrodes 11 arranged in a matrix, wherein a grid area is formed between the multiple sensor electrodes 11. The ESD protection electrode E1 is coplanar with the fingerprint sensor electrode array 10 on a plane (e.g., X-Y plane), wherein the ESD protection electrode E1 is formed in the grid area and presents a grid pattern.

In one embodiment, the fingerprint sensor electrode array 10 further includes multiple dummy electrodes 12, formed outside of the multiple sensor electrodes 11, and connected to the ESD protection electrode E1, wherein each of the multiple dummy electrodes 12 is formed in an area surrounded by the grid pattern. The ESD protection circuit ESD_PC is connected to the ESD protection electrodes E1, for providing an ESD path. In one embodiment, the ESD protection circuit ESD_PC may be a ground or a low electric potential terminal.

As shown in FIG. 2, the fingerprint sensor 1 further includes an ESD protection electrode E2 (denoted with slash patterns) formed below the grid area formed by the multiple sensor electrodes 11, and the ESD protection electrode E2 is not overlapped with the multiple sensor electrodes 11 along a Z direction. In one embodiment, a projection of the ESD protection electrode E2 onto the X-Y plane is overlapped with the ESD protection electrode E1, wherein a portion of the ESD protection electrodes E1 that is overlapped with electrodes E2 is denoted with slash patterns, and another portion of the ESD protection electrode E1 that is not overlapped with electrodes E2 is denoted with dot patterns. In the embodiment of FIG. 2, the ESD protection electrode E2 is configured with multiple cross-shape patterns. The ESD protection electrodes E1 may connect to the ESD protection electrode E2 by multiple conductive via V1. When the fingerprint sensor 1 encounters the electrostatic current, the electrostatic current may flow to the ESD protection circuit ESD_PC by the ESD protection electrode E1, to protect the fingerprint sensor 1 from damaging, so as to achieve the purpose of ESD protection.

Figure 3A:
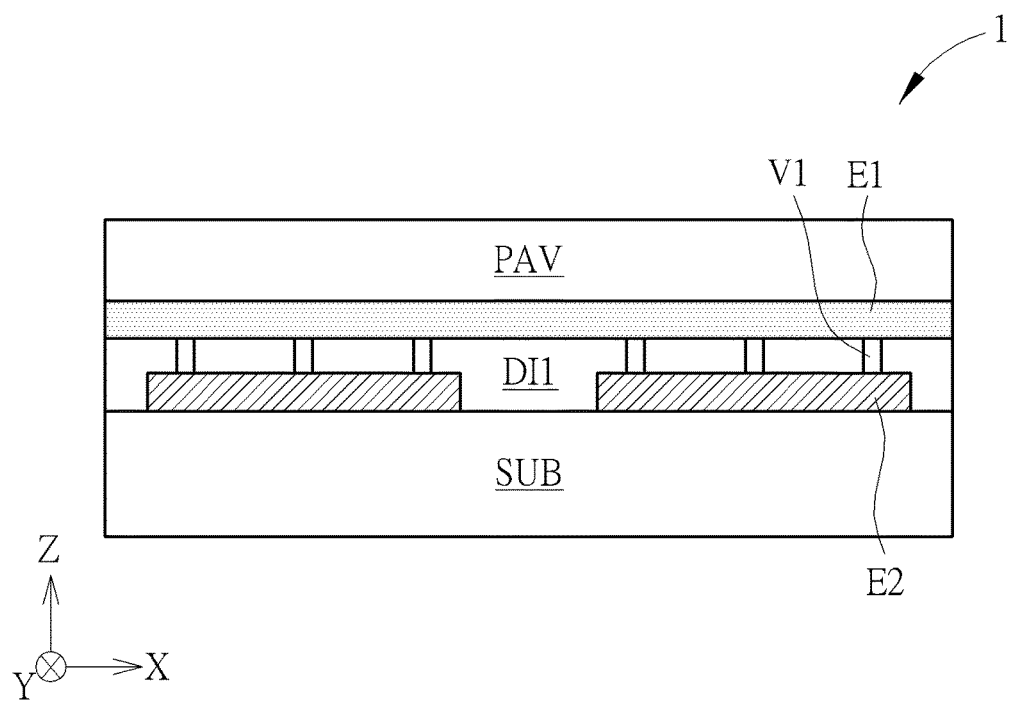
FIG. 3A to FIG. 3C illustrates a cross-section view of the fingerprint sensor in FIG. 2, respectively.
Figure 3B:
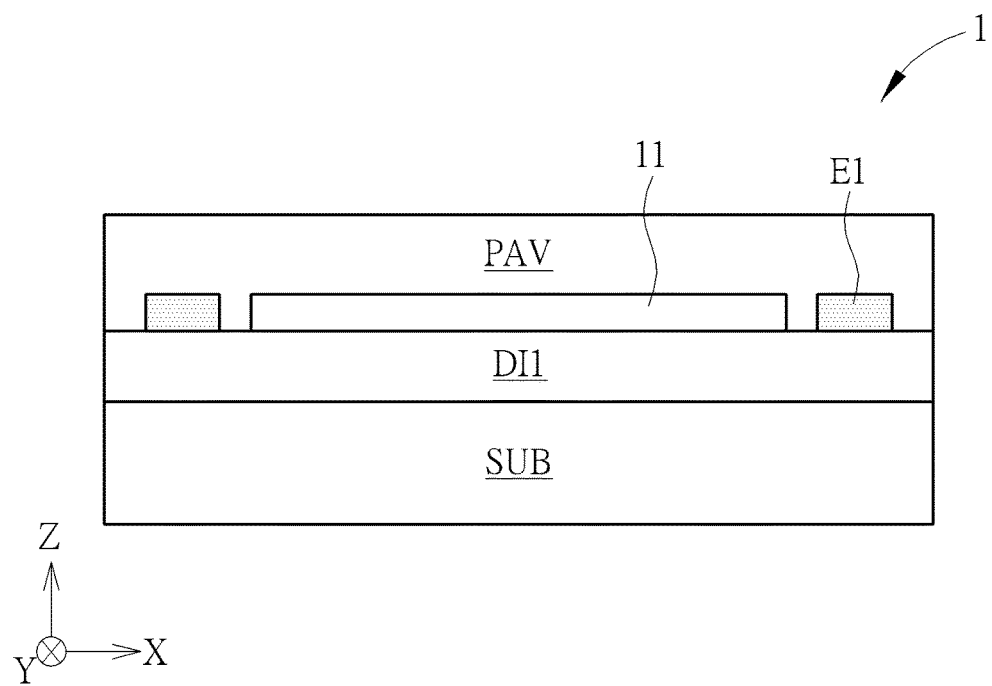
Figure 3C:
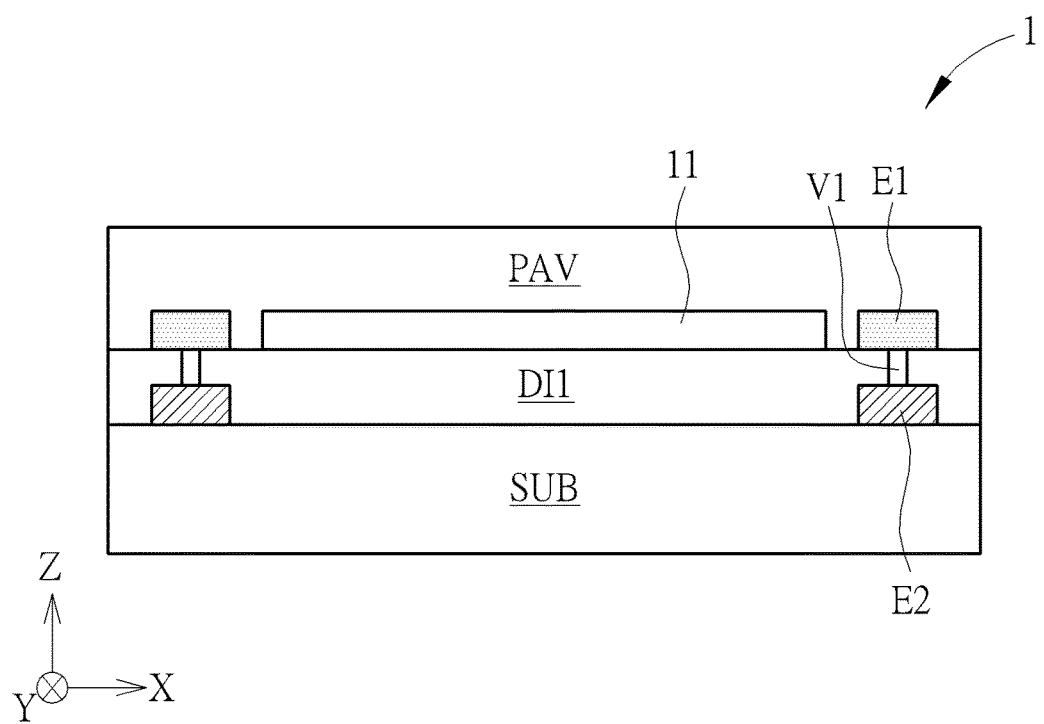

FIG. 3A to FIG. 3C illustrates a cross section A-A', a cross section B-B' and a cross section C-C' in FIG. 2, respectively. The cross section A-A' is located at where the ESD protection electrodes E1 and E2 and the conductive via V1 are overlapped, and is not overlapped with the sensor electrode 11. The cross section B-B' is located at where the ESD protection electrodes E1 and E2 and the conductive via V1 are not overlapped, and the sensor electrode 11 is sectioned by the cross section B-B'. The cross section C-C' is located at where the ESD protection electrodes E1 and E2 and the conductive via V1 are overlapped, and the sensor electrode 11 is sectioned by the cross section C-C'.

In FIG. 3A to FIG. 3C, the fingerprint sensor 1 further includes a protection layer PAV, a dielectric layer DI1, and a substrate SUB, wherein the substrate SUB is used for forming ESD protection circuit ESD_PC and a sensor circuit (not shown) for detecting the sensor electrode 11, and the substrate SUB may include conductive layers and dielectric layers. The protection layer PAV covers the fingerprint sensor electrode array 10 and the ESD protection electrode E1. A top surface of the protection layer PAV (i.e., another surface in opposite to the surface of the protection layer PAV covering the fingerprint sensor electrode array 10) provides a contact surface for the finger of the user. The dielectric layer DI1 is formed between the ESD protection electrodes E1 and E2, and covers the ESD protection electrode E2. The dielectric layer DI1 includes the multiple conductive via V1 for connecting the ESD protection electrodes E1 and E2.

As shown in figures, the ESD protection electrode E1 and the fingerprint sensor electrode array 10 are formed in a same layer, e.g. a layer that is closest to the protection layer PAV. In one embodiment, the ESD protection electrode E1 is coplanar with the fingerprint sensor electrode array 10. When detecting the fingerprint of the user, there is only the protection layer PAV between the fingerprint sensor electrode array 10 and the finger, which is benefit for obtaining greater induced capacitance variation. The multi-layer structure of the ESD protection electrodes E1 and E2, compared with the single ESD protection electrode E1, can provide an ESD path with lower impedance, such that the electrostatic current tends to flow to the ESD protection electrode E1, which enhances ESD protection effect. Any fingerprint sensor meets the above mentioned structure and corresponding function and purpose shall be incorporated in the present invention, those skilled in the art can make modifications or alterations accordingly, which is not limited to the embodiments of the present invention.

Figure 9:
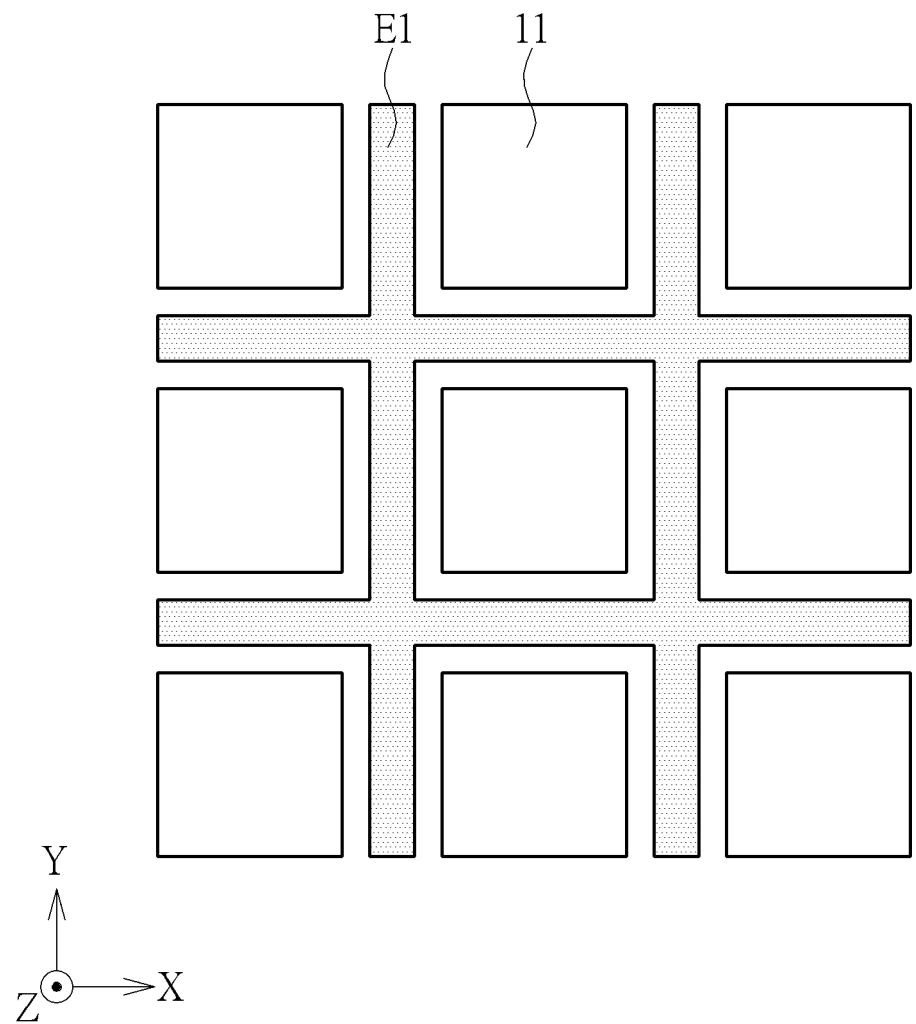
FIG. 9 illustrates a top view of a first ESD protection electrode according to an embodiment of the present invention.

FIG. 9 illustrates a top view of an ESD protection electrode E1 according to an embodiment of the present invention, where the ESD protection electrode E1 presents a grid pattern. In addition, there is no specific limitation to the pattern presented by the ESD protection electrode E2. In one embodiment, the pattern presented by the ESD protection electrode E2 may be the grid pattern presented by the ESD protection electrode E1 in FIG. 9.

Figure 4:
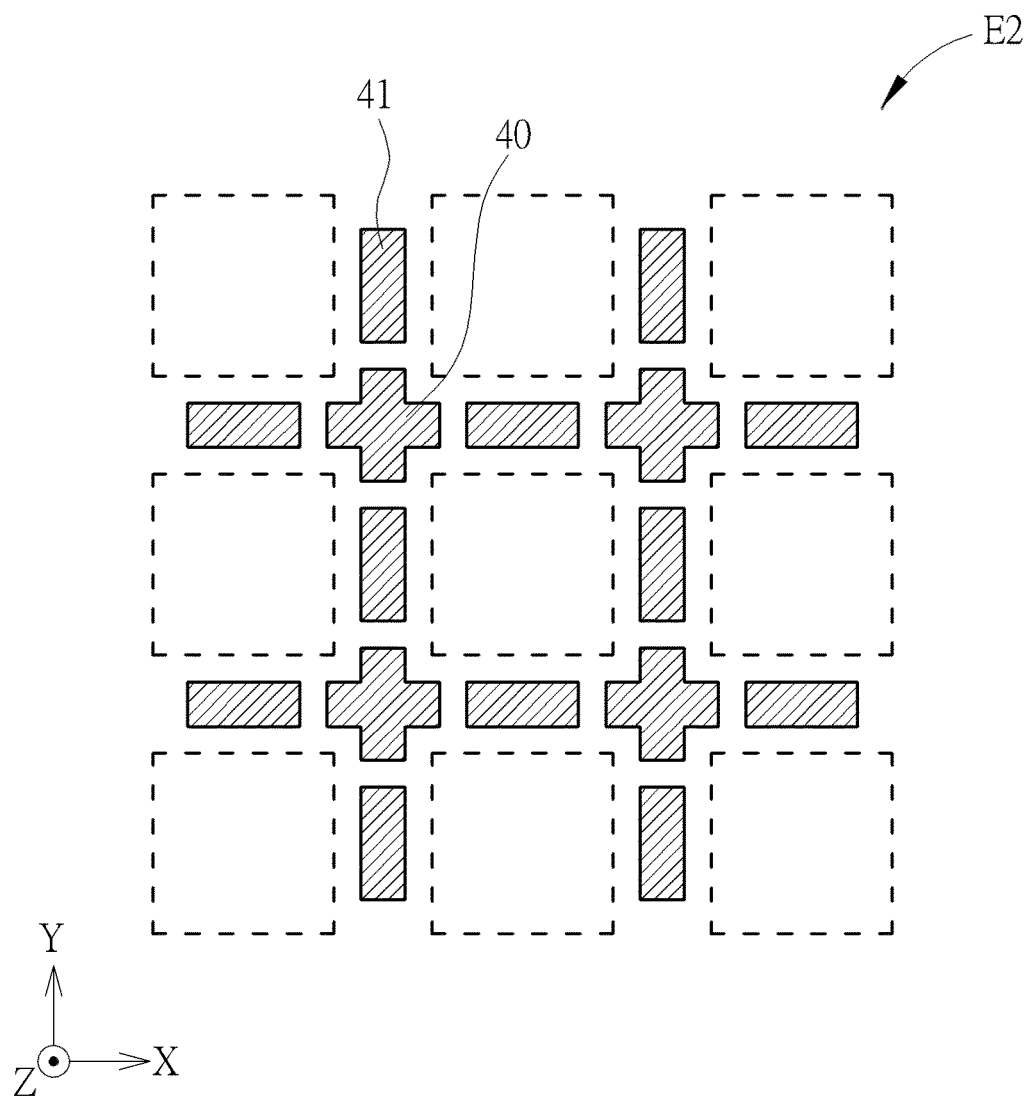
FIG. 4 illustrates a top view of a second ESD protection electrode according to an embodiment of the present invention.
Figure 5:
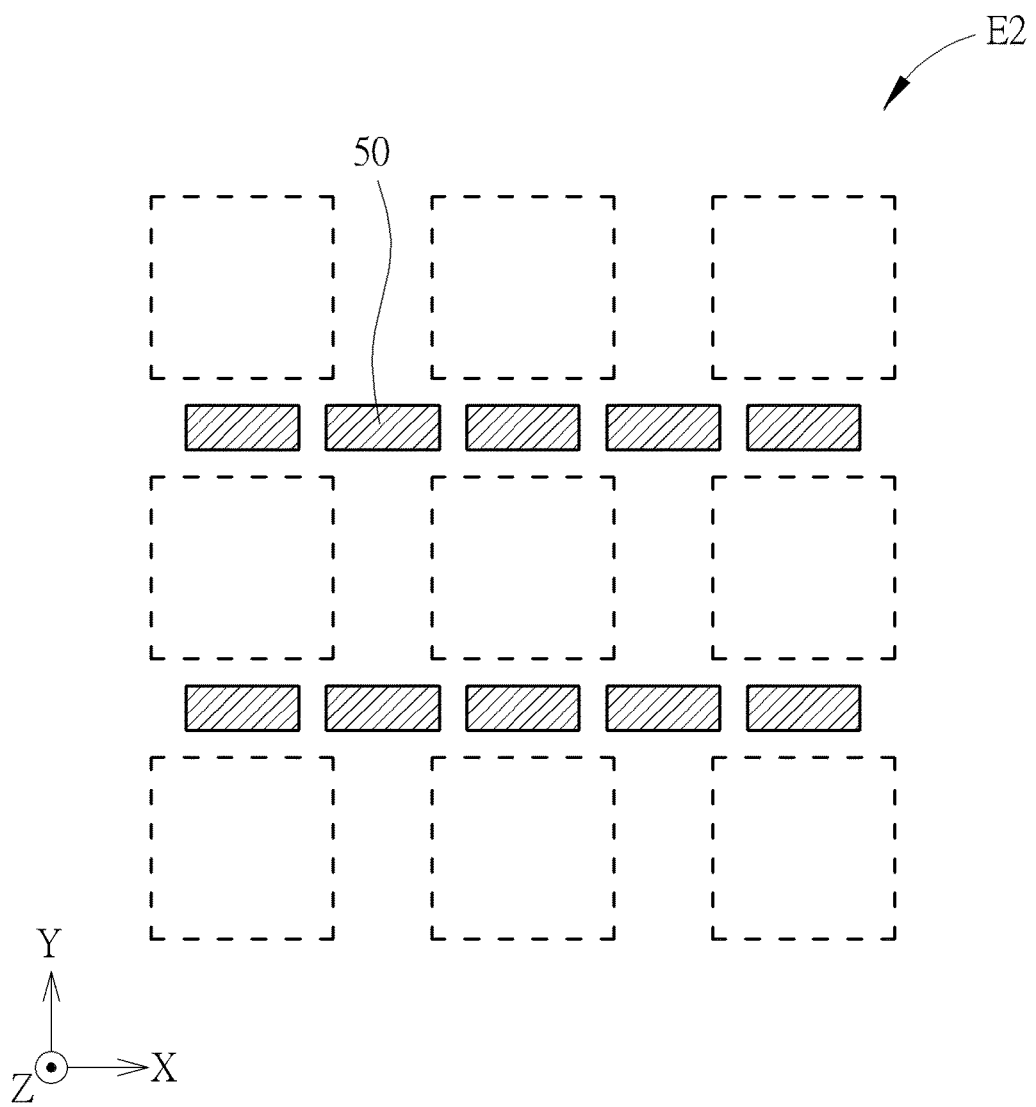
FIG. 5 illustrates a top view of another second ESD protection electrode according to an embodiment of the present invention.
Figure 6:
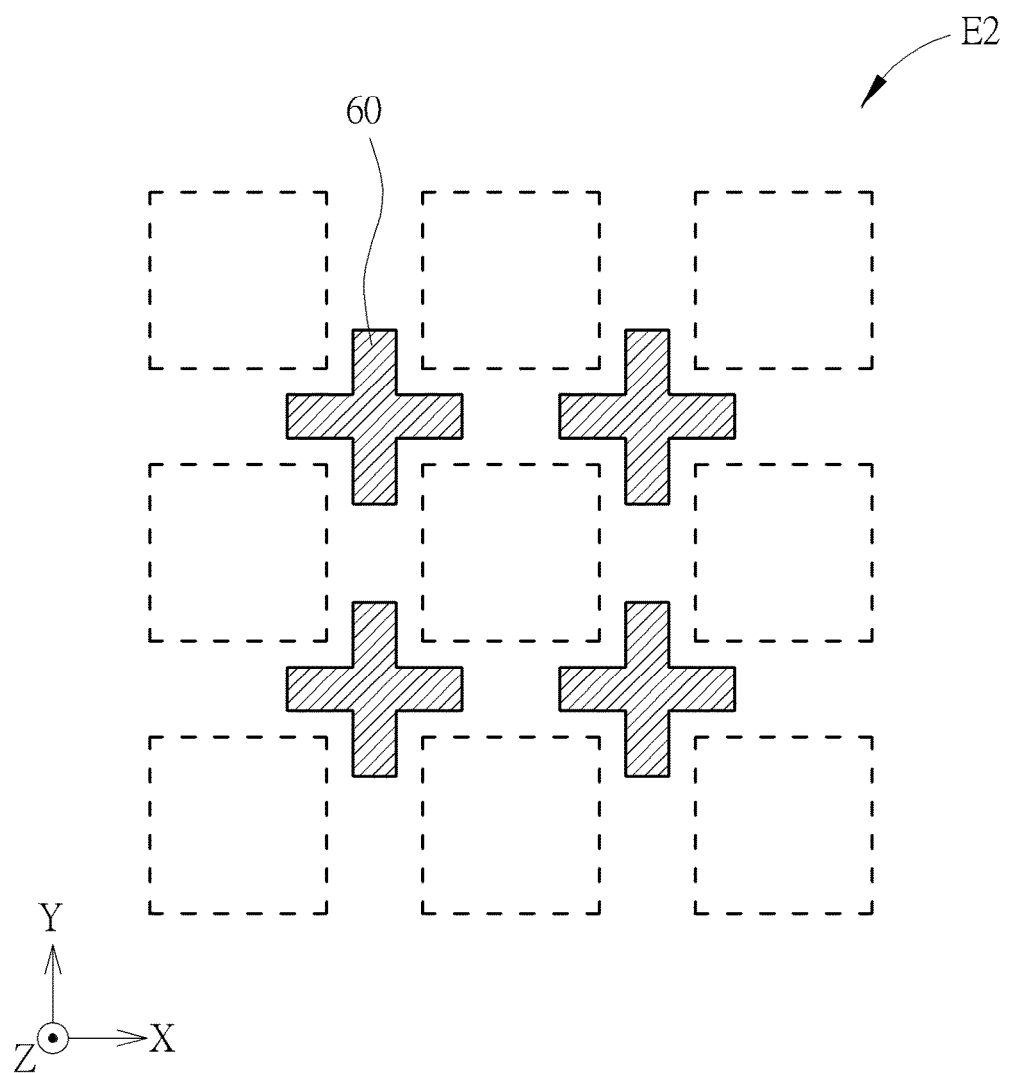
FIG. 6 illustrates a top view of another second ESD protection electrode according to an embodiment of the present invention.

FIG. 4 illustrates a top view of an ESD protection electrode E2 according to an embodiment of the present invention, wherein the ESD protection electrode E2 comprises multiple cross-shape patterns 40 and multiple rectangular patterns 41. FIG. 5 illustrates a top view of another ESD protection electrode E2, wherein the ESD protection electrode E2 comprises multiple rectangular patterns 50 arranged in multiple columns or multiple rows; in other words, the rectangular pattern 50 may be arranged in multiple columns or multiple rows along the X direction or the Y direction. FIG. 6 illustrates a top view of another ESD protection electrode E2, wherein the ESD protection electrode E2 comprises multiple cross-shape patterns 60.

In FIG. 4 to FIG. 6, the blocks denoted with dash line represent areas which are overlapped with the sensor electrode 11 along the Z direction, that is, the configuration of the ESD protection electrode E2 is not overlapped with the sensor electrode 11 along the Z direction. As shown in figures, the cross-shape pattern is located between four adjacent blocks denoted with dash line. In the ESD protection electrodes E2 of FIG. 4 to FIG. 6, each portion (e.g., the cross-shape pattern, or the rectangular pattern) is connected to the ESD protection electrode E1 in the upper layer by one or more conductive via V1.

Figure 7:
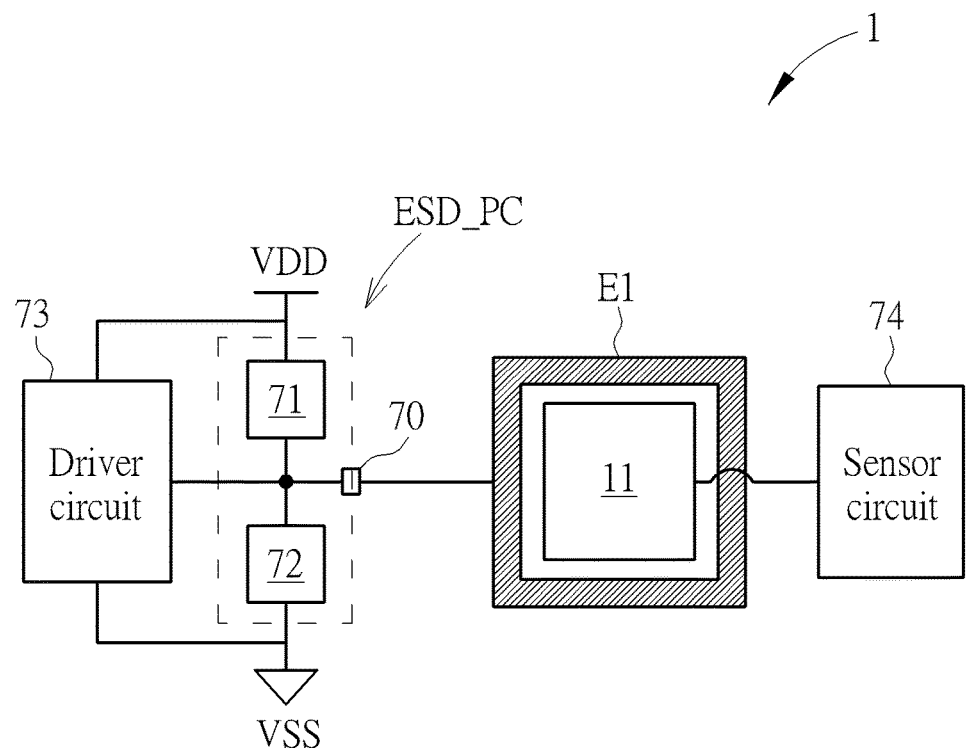
FIG. 7 is a functional block diagram of an ESD protection circuit according to an embodiment of the present invention.

FIG. 7 illustrates a functional block diagram of the ESD protection circuit ESD_PC according to an embodiment of the present invention. The ESD protection circuit ESD_PC includes a connecting terminal 70 and discharge units 71 and 72. The connecting terminal 70 is connected to the ESD protection electrode E1. The discharge unit 71 is coupled between a high electric potential terminal VDD and the connecting terminal 70, for providing a discharge path for positive static electric charges to the high electric potential terminal VDD. The discharge unit 72 is coupled between a low electric potential terminal VSS and the connecting terminal 70, for providing a discharge path for negative static electric charges to the low electric potential terminal VSS, wherein the low electric potential terminal VSS may be a ground.

In one embodiment, the discharge units 71 and 72 may be a diode. A cathode of the discharge unit 71 is coupled to the high electric potential terminal VDD, and an anode of the discharge unit 71 is coupled to the connecting terminal 70. An anode of the discharge unit 72 is coupled to the low electric potential terminal VSS, and a cathode of the discharge unit 72 is coupled to the connecting terminal 70.

In another embodiment, the discharge unit 71 is a P-type Metal-Oxide-Semiconductor (PMOS) transistor, wherein a drain of the PMOS transistor is connected to the connecting terminal 70, a gate of the PMOS transistor is connected to a source of the PMOS transistor, and the source is connected to the high electric potential terminal VDD. The discharge unit 72 is a N-type Metal-Oxide-Semiconductor, (NMOS) transistor, wherein a drain of the NMOS transistor is connected to the connecting terminal 70, a gate of the NMOS transistor is connected to a source of the NMOS transistor, and the source of the NMOS transistor is connected to the low electric potential terminal VSS. In another embodiment, the first and second discharge units 71 and 72 are Silicon Controlled Rectifier (SCR).

Figure 8:
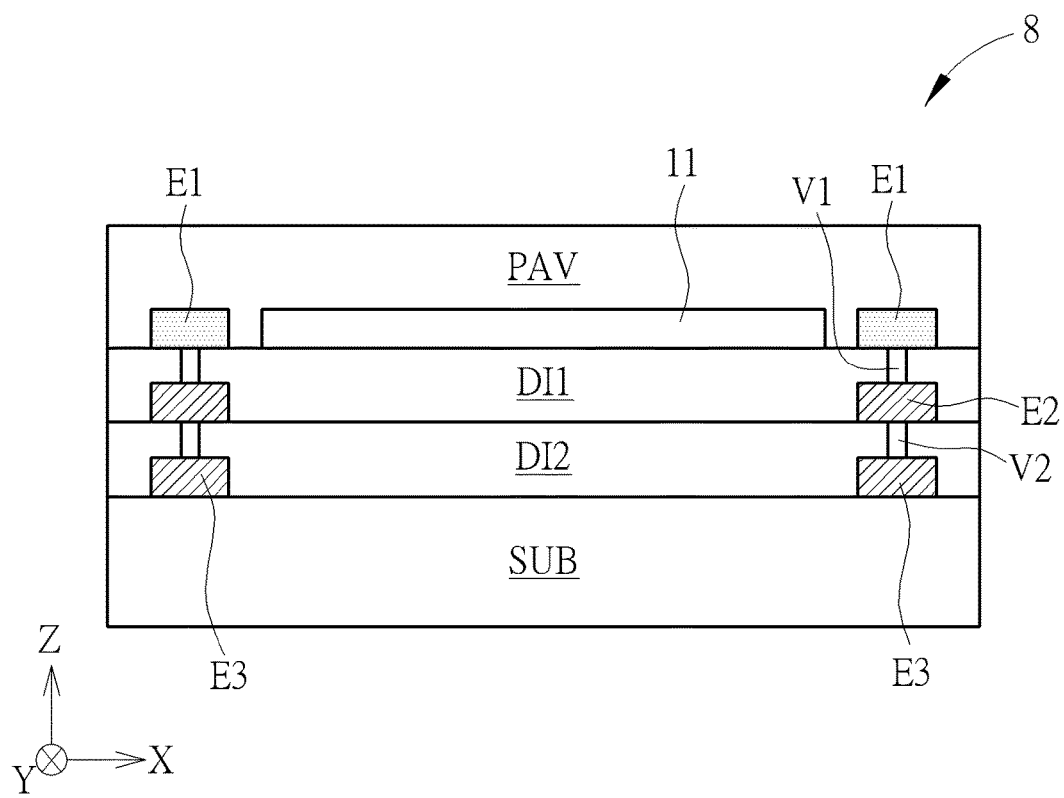
FIG. 8 illustrates a cross-section view of a fingerprint sensor according to an embodiment of the present invention.

In the embodiment of FIG. 7, the fingerprint sensor 1 further includes a driver circuit 73 and a sensor circuit 74. The sensor circuit 74 is connected to the sensor electrode 11, for sensing a capacitance variation of the sensor electrode 11, to recognize the ridge or valley of the fingerprint. The driver circuit 73 is coupled to the ESD protection electrode E1, and cooperates with the sensor circuit 74 to provide different voltages to the ESD protection electrode E1 at different timing phases, in order to decrease influence to the sensing results of the fingerprint due to parasitic capacitances between the sensor electrode 11 and the ESD protection electrodes E1 and E2. The more layers of the connected ESD protection electrodes, the lower total impedance of the connected ESD protection electrodes can provide. The present invention is not limited to only two layers of the ESD protection electrodes. For example, in the embodiment of FIG. 8, in addition to the ESD protection electrode E1 and E2 in FIG. 3, the fingerprint sensor 8 further includes an ESD protection electrode E3 formed below the grid area formed by the multiple sensor electrodes 11, and the ESD protection electrode E3 is not overlapped with the sensor electrode 11 along the Z direction. A dielectric layer DI2 is formed between the ESD protection electrodes E2 and E3, and covers the ESD protection electrode E3. The dielectric layer DI2 includes multiple conductive via V2, where the conductive via V2 is used for connecting the ESD protection electrodes E3 and E2.

According to the configurations of the present invention, each of the sensor electrodes 11 may have a same size, which is not influenced by the ESD protection electrode E1 or E2. The ESD protection electrode E2 (or both the ESD protection electrodes E2 and E3) in lower layer can provide electrostatic current blocking effect, to prevent electrostatic power from flowing downwardly to the inner circuit and element of the fingerprint sensor 1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fingerprint sensor having electrostatic discharge (ESD) protection, comprising:
   a fingerprint sensor electrode array comprising multiple sensor electrodes, wherein a grid area is formed between the multiple sensor electrodes;
   a first ESD protection electrode, wherein the first ESD protection electrode is formed in the grid area and coplanar with the fingerprint sensor electrode array;
   a protection layer, covering the fingerprint sensor electrode array and the first ESD protection electrode;
   a second ESD protection electrode formed below the grid area, wherein the second ESD protection electrode is not overlapped with the multiple sensor electrodes along a first direction perpendicular to the fingerprint sensor electrode array;
   a first dielectric layer, formed between the first ESD protection electrode and the second ESD protection electrode, covering the second ESD protection electrode, and comprising multiple first conductive via, wherein the multiple first conductive vias connect the first ESD protection electrode and the second ESD protection electrode; and
   an ESD protection circuit, connected to the first ESD protection electrode.

2. The fingerprint sensor of claim 1, wherein a pattern of the first ESD protection electrode is a grid pattern.

3. The fingerprint sensor of claim 2, wherein the fingerprint sensor electrode array further comprises multiple dummy electrodes formed outside of the multiple sensor electrodes, electrically connected to the first ESD protection electrode, and each of the multiple dummy electrodes is formed in an area surrounded by the first ESD protection electrode.

4. The fingerprint sensor of claim 1, wherein a pattern of the second ESD protection electrode is a grid pattern or comprises multiple cross-shape patterns.

5. The fingerprint sensor of claim 1, wherein a pattern of the second ESD protection electrode comprises multiple rectangular patterns which are arranged in multiple columns or multiple rows with spacing, or multiple cross-shape patterns and multiple rectangular patterns.

6. The fingerprint sensor of claim 1, wherein the ESD protection circuit provides a connection to a ground or a low electric potential terminal.

7. The fingerprint sensor of claim 1, wherein the ESD protection circuit is connected to a high voltage and a low voltage, and the ESD protection circuit comprises:
   a connecting terminal, electrically connected to the first ESD protection electrode;
   a first discharge unit, coupled between the high electric potential terminal and the connecting terminal, for providing a discharge path for positive static electric charges to the high electric potential terminal; and
   a second discharge unit, coupled between the low electric potential terminal and the connecting terminal, for providing a discharge path for negative static electric charges to the low electric potential terminal.

8. The fingerprint sensor of claim 7, wherein:
   the first discharge unit is a diode, comprises a cathode coupled to the high electric potential terminal, and a anode coupled to the connecting terminal; and
   the second discharge unit is a diode, comprises an anode coupled to the low electric potential terminal, and a cathode coupled to the connecting terminal.

9. The fingerprint sensor of claim 1, further comprising:
   a third ESD protection electrode, formed below the grid area; and
   a second dielectric layer, formed between the second ESD protection electrode and the third ESD protection electrode, and covering the third ESD protection electrode; wherein the second dielectric layer comprises multiple second conductive via, for connecting the third ESD protection electrode and the second ESD protection electrode.

* * * * *